(12) United States Patent
Lim et al.

(10) Patent No.: US 11,228,068 B2
(45) Date of Patent: Jan. 18, 2022

(54) RECHARGEABLE BATTERY INCLUDING TERMINAL PORTION SLIDABLE ON CAP PLATE AND BATTERY MODULE

(71) Applicant: SAMSUNG SDI CO., LTD., Yongin-si (KR)

(72) Inventors: Dooyong Lim, Yongin-si (KR); Jangwoong Bae, Yongin-si (KR); Jisoon Lim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 91 days.

(21) Appl. No.: 16/452,953

(22) Filed: Jun. 26, 2019

(65) Prior Publication Data
US 2020/0020896 A1    Jan. 16, 2020

(30) Foreign Application Priority Data
Jul. 11, 2018   (KR) .................. 10-2018-0080729

(51) Int. Cl.
*H01M 50/15*    (2021.01)
*H01M 50/10*    (2021.01)
(Continued)

(52) U.S. Cl.
CPC ........... *H01M 50/15* (2021.01); *H01M 50/10* (2021.01); *H01M 50/147* (2021.01);
(Continued)

(58) Field of Classification Search
CPC .. H01M 2/0473; H01M 2/0237; H01M 2/043; H01M 2/206; H01M 2/305;
(Continued)

(56) References Cited

U.S. PATENT DOCUMENTS

| 6,033,802 A | 3/2000 | Stocchiero |
| 2011/0200870 A1* | 8/2011 | Kim ........................ H01M 2/30 429/179 |

(Continued)

FOREIGN PATENT DOCUMENTS

| CA | 2827341 A1 * | 8/2014 | .......... H01M 50/543 |
| CN | 1176709 A | 3/1998 | |

(Continued)

OTHER PUBLICATIONS

China Office Action from corresponding Chinese Patent Application No. 201910535333.7, Chinese Office Action dated Oct. 11, 2021, and accompanying Search Report dated Sep. 29, 2021, with English translation (23 pgs.).

*Primary Examiner* — Sean P Cullen
(74) *Attorney, Agent, or Firm* — Lewis Roca Rothgerber Christie LLP (57) ABSTRACT

A rechargeable battery and a battery module are provided. According to embodiments, a rechargeable battery includes: an electrode assembly including a first electrode, a second electrode, and a separator; a case accommodating the electrode assembly therein and including an open side; a cap plate coupled to the open side of the case; and a terminal portion arranged on the cap plate to be electrically connected to the electrode assembly, and the terminal portion is slidable in a direction on the cap plate.

15 Claims, 6 Drawing Sheets

(51) Int. Cl.
*H01M 50/147* (2021.01)
*H01M 50/502* (2021.01)
*H01M 50/543* (2021.01)
*H01M 50/578* (2021.01)

(52) U.S. Cl.
CPC ....... *H01M 50/502* (2021.01); *H01M 50/543* (2021.01); *H01M 50/578* (2021.01); *H01M 2200/20* (2013.01); *H01M 2220/20* (2013.01)

(58) Field of Classification Search
CPC .... H01M 2/345; H01M 50/15; H01M 50/502; H01M 50/543; H01M 50/578; H01M 50/10; H01M 50/147
USPC ....... 429/149, 156, 158, 160, 178, 179, 180, 429/181
See application file for complete search history.

(56) References Cited

U.S. PATENT DOCUMENTS

| | | | |
|---|---|---|---|
| 2013/0095369 A1 | 4/2013 | Yoon et al. | |
| 2015/0287969 A1* | 10/2015 | Nakayama | H01M 2/206 429/121 |
| 2015/0349317 A1 | 12/2015 | Byun et al. | |
| 2016/0072117 A1 | 3/2016 | Sim | |
| 2016/0260960 A1* | 9/2016 | Guen | H01M 2/0473 |

FOREIGN PATENT DOCUMENTS

| | | | | |
|---|---|---|---|---|
| CN | 104285316 A | | 1/2015 | |
| CN | 105280873 A | | 1/2016 | |
| DE | 102012218160 A1 | * | 6/2014 | ......... H01M 50/543 |
| JP | 2013-161692 A | | 8/2013 | |
| KR | 10-2016-0107062 A | | 9/2016 | |
| KR | 10-1666876 B1 | | 10/2016 | |
| WO | WO 2014-053303 A1 | | 4/2014 | |

* cited by examiner

RECHARGEABLE BATTERY INCLUDING TERMINAL PORTION SLIDABLE ON CAP PLATE AND BATTERY MODULE

CROSS-REFERENCE TO RELATED APPLICATION

This application claims priority to and benefit of Korean Patent Application No. 10-2018-0080729, filed on Jul. 11, 2018 in the Korean Intellectual Property Office, the entire content of which is incorporated herein by reference.

BACKGROUND

1. Field

Aspects of embodiments of the present invention relate to a rechargeable battery and a battery module, with a terminal portion that is electrically connected to an electrode assembly and exposed to the outside.

2. Description of the Related Art

A rechargeable battery differs from a primary battery in that it can be repeatedly charged and discharged, while the latter is incapable of being recharged. Low-capacity rechargeable batteries are used in portable electronic devices, such as mobile phones, laptop computers, and camcorders, and large capacity batteries are widely used as power sources for driving a motor, such as for hybrid vehicles.

A high-power rechargeable battery using a non-aqueous electrolyte having high energy density has been developed, and a plurality of high-output rechargeable batteries may be connected through bus bars to have high capacity so as to be used for devices requiring high electric power.

The rechargeable battery may have a terminal portion that is electrically connected to the electrode assembly and exposed to the outside, and the terminal portion may be connected to a connection terminal of an external device requiring power, or may be coupled to a bus bar for implementing large capacity.

Meanwhile, when a rechargeable battery having a terminal portion that is connected to a bus bar or a connection terminal of an external device is swollen due to an external force applied thereto or a swelling phenomenon occurring therein, the thus-generated external force may be applied to the terminal portion that is connected to the bus bar or the connection terminal to damage or deform the connection terminal, the bus bar, the terminal portion, etc., and, thus, it is desirable to avoid or reduce the external force or displacement transferred to the terminal portion.

The above information disclosed in this Background section is only for enhancement of understanding of the background of the invention and, therefore, it may contain information that does not form the prior art that is already known in this country to a person of ordinary skill in the art.

SUMMARY

According to an aspect of embodiments of the present invention, a rechargeable battery and a battery module with a terminal portion that is electrically connected to an electrode assembly and exposed to the outside are provided. According to an aspect of embodiments of the present invention a rechargeable battery and a battery module are capable of effectively suppressing damage to a terminal portion or the like from a load or displacement transferred to the terminal portion, while maintaining structural stability.

According to one or more embodiments of the present invention, a rechargeable battery includes: an electrode assembly including a first electrode, a second electrode, and a separator; a case accommodating the electrode assembly therein and including an open side; a cap plate coupled to the open side of the case; and a terminal portion arranged on the cap plate to be electrically connected to the electrode assembly, wherein the terminal portion is slidable in a direction on the cap plate.

The direction may be parallel to a width direction of the cap plate, and the terminal portion may be slidable by an external force transferred in the direction.

The cap plate may include a guide protrusion that extends in the direction and protrudes toward the terminal portion, and the terminal portion may include a guide groove that extends in the direction and into which the guide protrusion is inserted to be slidable.

The cap plate may further include a stepped groove that is stepped on an inner side of the case and into which at least a portion of the terminal portion is slidably inserted.

The terminal portion may further include an insertion portion having a length that is shorter than the stepped groove in the direction and protruding toward the stepped groove to be inserted into the stepped groove.

The guide protrusion may be arranged in the stepped groove to extend over the entire stepped groove in the direction, and the guide groove may be open at opposite ends along the direction.

The guide protrusion may be arranged in the stepped groove to have a shorter length than the guide groove in the direction, and may be entirely inserted into the guide groove.

The terminal portion may include: a terminal plate electrically connected to the electrode assembly; and an insulating plate between the terminal plate and the cap plate to be fixed to a lower portion of the terminal plate, and the guide groove may be on a surface of the insulating plate facing the cap plate.

The rechargeable battery may further include a column portion configured to extend through the cap plate to electrically connect the terminal portion and the electrode assembly, the cap plate may include a terminal hole through which the column portion extends, and the terminal hole may have a long shape that extends in the direction such that the column portion is movable in the direction.

The rechargeable battery may further include a sealing gasket between an inner surface of the terminal hole and the column portion to seal the terminal hole, and the sealing gasket may be made of an elastic material such that the column portion is movable in the direction and to maintain a sealing state of the terminal hole.

The rechargeable battery may further include a current collecting member inside the case and including a first side coupled with the electrode assembly and a second side coupled with the column portion, and the second side of the current collecting member may be movable in the direction together with the column portion.

The cap plate may include a short-circuit member that is deformable to protrude outside of the case as an internal pressure of the case rises, and the terminal portion may be slidable in a state in which at least a portion thereof is located at an upper portion of the short-circuit member.

According to one or more embodiments of the present invention, a battery module includes a rechargeable battery including a case accommodating an electrode assembly therein, a cap plate coupled to an open side of the case, and a terminal portion arranged on the cap plate to be electrically connected to the electrode assembly, wherein the terminal portion is slidable on the cap plate in a direction.

The rechargeable battery may include a plurality of rechargeable batteries which are arranged along a width direction of the cap plate, each terminal portion of adjacent rechargeable batteries may be electrically connected to each other through a bus bar, and the terminal portion may be slidable in the width direction together with the bus bar.

The rechargeable battery may further include a column portion configured to extend through the cap plate to electrically connect the terminal portion and the electrode assembly, the cap plate may include a terminal hole through which the column portion extends, and the terminal hole may have a long shape that extends in the width direction such that the column portion is movable in the width direction together with the terminal portion and the bus bar.

According to an aspect of embodiments of the present invention, a rechargeable battery and a battery module are capable of effectively suppressing damage to a terminal portion or the like from a load or displacement transferred to the terminal portion, while maintaining structural stability.

DESCRIPTION OF SYMBOLS

| 10: electrode assembly | 20: case |
|---|---|
| 30: cap plate | 31: vent hole |
| 32: electrolyte injection opening | 33: terminal hole |
| 34: short-circuit hole | 35: short-circuit member |
| 38: guide protrusion | 39: stepped groove |
| 40: current collecting member | 50: terminal portion |
| 52: terminal plate | 54: insulating plate |
| 58: guide groove | 59: insertion portion |
| 60: column portion | 70: sealing gasket |
| 100: rechargeable battery | 105: bus bar |
| 200: battery module | |

DETAILED DESCRIPTION

In the following detailed description, certain example embodiments of the present invention are shown and described, simply by way of illustration.

As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In this specification, redundant descriptions for the same constituent elements may be omitted.

In this specification, it is to be understood that when one component is referred to as being "connected" or "coupled" to another component, it may be connected or coupled directly to the other component or may be connected or coupled to the other component with one or more further components intervening therebetween. In this specification, it is to be understood that when one component is referred to as being "connected or coupled directly" to another component, it may be connected to or coupled to the other component without another component intervening therebetween.

It is also to be understood that the terminology used herein is for the purpose of describing particular embodiments, and is not intended to be limiting of the invention.

Singular forms are to include plural forms unless the context clearly indicates otherwise.

It is to be further understood that terms such as "comprises" or "have" used in the present specification specify the presence of stated features, numerals, steps, operations, components, parts, or a combination thereof, but do not preclude the presence or addition of one or more other features, numerals, steps, operations, components, parts, or a combination thereof.

In addition, as used herein, the term "and/or" includes any plurality of combinations of items or any of a plurality of listed items. In this specification, "A or B" may include "A," "B," or "A and B".

It is to be understood that, although the terms "first," "second," etc. may be used herein to describe various elements, these elements should not be limited by these terms. These terms are used to distinguish one element from another. For example, a first element could be termed a "second" element, and, similarly, a second element could be termed a "first" element, without departing from the scope of example embodiments of the inventive concept. The terms of a singular form may include plural forms unless the context clearly indicates otherwise.

In addition, terms such as "below," "lower," "above," "upper," and the like are used to describe the relationship of the configurations shown in the drawings. However, the terms are used as a relative concept and are described with reference to the direction indicated in the drawings.

Unless otherwise defined, all terms (including technical and scientific terms) used herein have the same meaning as commonly understood by one of ordinary skill in the art to which the inventive concept pertains. It is also to be understood that terms defined in commonly used dictionaries should be interpreted as having meanings consistent with the meanings in the context of the related art, and are expressly defined herein unless they are interpreted in an ideal or overly formal sense.

Figure 1:
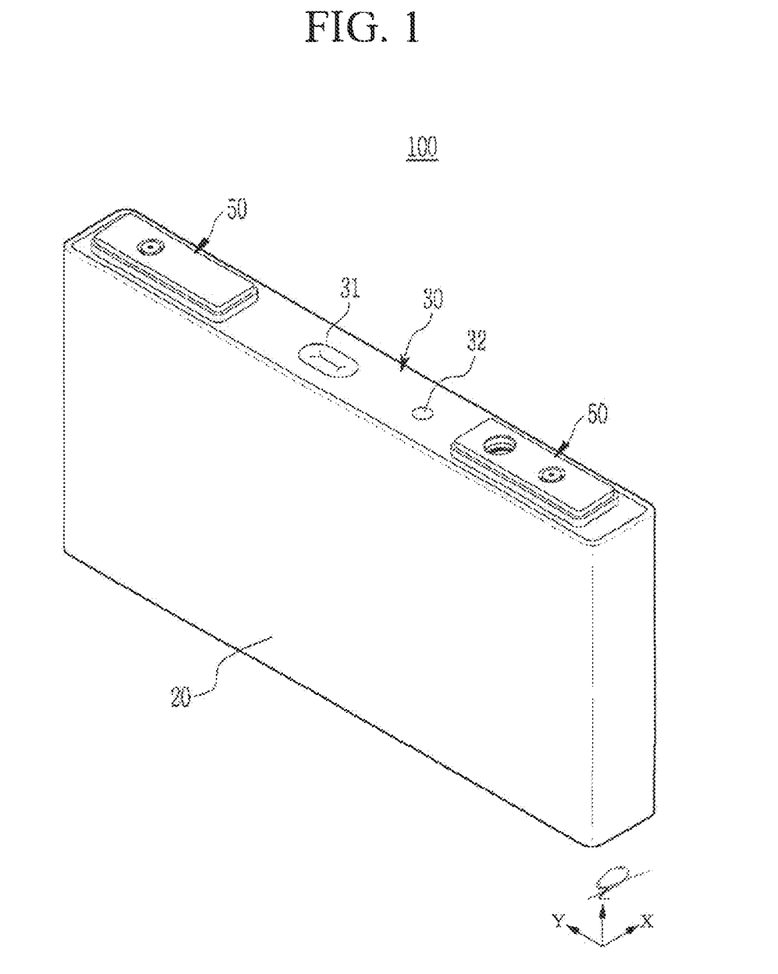
FIG. 1 illustrates a perspective view of a rechargeable battery according to an embodiment of the present invention.
Figure 2:
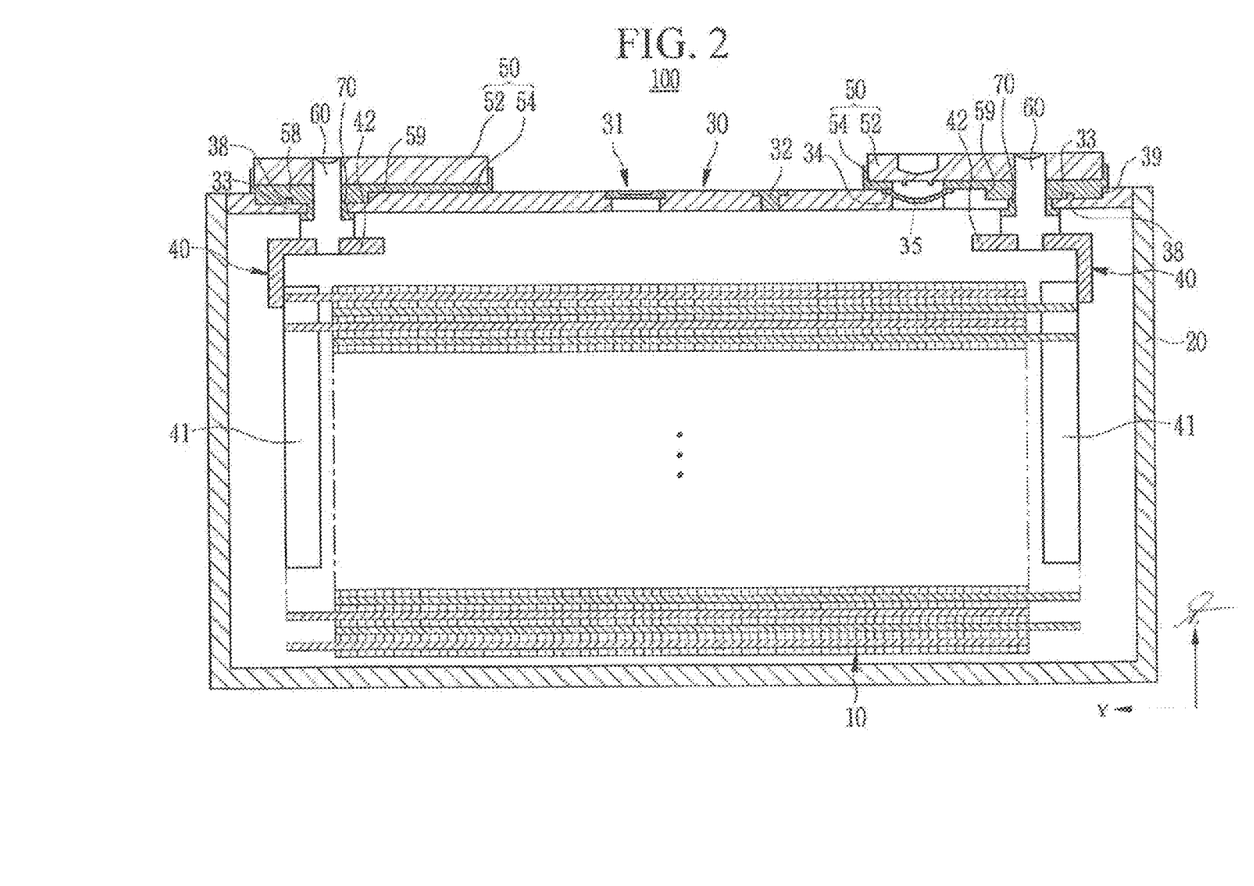
FIG. 2 illustrates a longitudinal cross-sectional view of a rechargeable battery according to an embodiment of the present invention.

As illustrated in FIG. 1 and FIG. 2, according to an embodiment of the present invention, a rechargeable battery 100 includes an electrode assembly 10 including a first electrode, a second electrode, and a separator, a case 20 having an open side for accommodating the electrode assembly 10 therein, a cap plate 30 coupled to the open side of the case 20, and a terminal portion 50 disposed on the cap plate 30 to be connected to the electrode assembly 10, wherein the terminal portion 50 is slidable on the cap plate 30 in a direction (e.g., one direction).

A lithium ion rechargeable battery having a quadrangular shape will be described as an example of the rechargeable battery 100. However, the present invention is not limited thereto, and embodiments of the present invention may be applied to any of various types of batteries, such as a lithium polymer battery or a cylindrical battery.

The rechargeable battery 100 may be used as an energy source for equipment operating with electrical energy, such as hybrid electric vehicles (HEVs), electric vehicles (EVs), cordless cleaners, electric bicycles, and electric scooters, for example.

The electrode assembly 10 is illustrated in FIG. 2, and includes a first electrode, a second electrode, and a separator. In an embodiment, the electrode assembly 10 may include a plurality of electrode assemblies 10, and in the form of being flatly pressed after being wound around a winding axis with the separator interposed between the first electrode and the second electrode.

The first electrode and the second electrode may include an active region, which is a region where an active material is applied to a thin plate formed of a metal foil, and an uncoated region, which is a region where the active material is not coated.

In an embodiment, an active region of the first electrode may be formed by coating an active material such as a transition metal oxide, etc., on a metal foil, such as an aluminum foil, and an active region of the second electrode may be formed by coating an active metal, such as graphite or carbon, on a metal foil, such as a copper or nickel foil.

Uncoated regions of the first electrode and the second electrode may respectively protrude from sides of the active regions of the first and second electrodes in a longitudinal direction Y of the case 20, and may be spaced apart and have different polarities.

As a result, the uncoated regions of the first electrode and second electrode may be respectively arranged opposite to each other at opposite ends of the electrode assembly 10 along the longitudinal direction Y of the case 20.

When the first electrode and the second electrode are disposed so as to overlap each other in the case 20, the uncoated regions of the first electrode and the second electrode may be respectively formed by a plurality of thin films which are overlapped with each other. In an embodiment, the thin films of each uncoated regions may be in contact with each other by ultrasonic welding in order to facilitate current movement.

The uncoated regions of the first electrode and the second electrode may be respectively formed integrally with the metal foils of the active regions of the first electrode and the second electrode.

The separator may be disposed between the active regions of the first electrode and the second electrode to serve to prevent or substantially prevent a short circuit and to enable movement of the lithium, and may be formed of, for example, a composite film of polyethylene, polypropylene, polyethylene, and/or polypropylene, for example.

The winding axis of the electrode assembly 10 may be inserted into the case 20 in a direction that is parallel to the longitudinal direction Y of the case 20, and the electrode assembly 10 may be accommodated in the case 20 together with an electrolyte solution. The electrolyte solution may be composed of an organic solvent, such as EC, PC, DEC, EMC, and DMC, and a Li salt such as $LiPF_6$ and $LiBF_4$. The electrolyte solution may be in a liquid, solid, or gel state.

The case 20 accommodates the electrode assembly 10 therein and has an open side. A space in which the electrode assembly 10 and the electrolyte solution are accommodated is formed in the case 20, which, in an embodiment, has a substantially cuboid shape with an opening formed in a side thereof. The opening of the case 20 allows the electrode assembly 10 to be inserted into the case 20.

In an embodiment, the case 20 may be made of a metal, such as aluminum or stainless steel. In an embodiment, the case 20 may be electrically connected to either the first electrode or the second electrode.

The cap plate 30 is coupled to the open side of the case 20. The cap plate 30 may be formed to have a shape corresponding to the shape of the open side of the case 20, and, in an embodiment in which the case 20 has a substantially cuboid shape, the cap plate 30 may have a plate shape that extends in a direction.

In an embodiment, the cap plate 30 may be formed of a same material as the case 20, and may be coupled to the case 20 by a laser welding method or the like. The cap plate 30 may be electrically connected to the case 20, and, in an embodiment in which the case 20 is electrically connected to the first or second electrode of the electrode assembly 10, the cap plate 30 may have a same polarity as the case 20.

In an embodiment, the cap plate 30 includes an electrolyte injection opening 32 for injecting an electrolyte, a vent hole 31 in which a vent plate formed with a notch may be opened at a certain opening pressure (e.g., a predetermined opening pressure), a short-circuit hole 34 in which a short-circuit member 35 is installed to short circuit the rechargeable battery at a certain opening pressure (e.g., a predetermined opening pressure), and a terminal hole 33 into which a column portion 60 is inserted.

The electrolyte injection opening 32 has a circular or polygonal sectional shape, and a size thereof is not particularly limited as long as a nozzle for injecting the electrolyte solution may be inserted thereinto and the strength of the cap plate 30 and the like is not significantly deteriorated.

After the cap plate 30 is coupled to the case 20, the electrolyte solution may be injected into the case 20 through the electrolyte injection opening 32. After injecting the electrolyte, the electrolyte injection opening 32 may be sealed with a sealing stopper. In an embodiment, in addition to the structure sealing the electrolyte injection opening 32 with the sealing stopper, a filling material, such as solder, may be filled and sealed in the electrolyte injection opening 32 through a soldering process.

The vent hole 31 is sealed with a vent plate so as to discharge an internal pressure of the case 20. When the internal pressure of the case 20 reaches a certain pressure (e.g., a predetermined pressure), the vent plate is opened to open the vent hole 31. A notch may be formed in the vent plate to facilitate the opening of the vent plate.

The short-circuit member 35 is installed in the short-circuit hole 34. In an embodiment, the short-circuit member 35 may include a curved portion bent in a convex arc shape toward the electrode assembly 10 in a state in which the pressure inside the case 20 is normal, and an edge portion provided outside the curved portion and fixed to a side wall of the short-circuit hole 34.

When a gas is generated in the rechargeable battery 100 due to an abnormal reaction, the internal pressure of the rechargeable battery 100 rises. In an embodiment, the short-circuit member 35 is electrically connected to the cap plate 30, and when the internal pressure of the rechargeable battery 100 or the case 20 is higher than a certain operating pressure (e.g., a design-predetermined operating pressure) of the short-circuit member 35, the curved portion is deformed such that the convex direction is away from the electrode assembly 10.

In an embodiment, the short-circuit member 35 having the curved portion deformed is brought into contact with the terminal portion 50 disposed to face the curved portion, thereby causing a short circuit. When a short circuit occurs, no further cell reaction occurs, and an explosion due to an increase in the internal pressure therein may be prevented or substantially prevented.

In an embodiment, the terminal portion 50 may further include at least one protrusion protruding toward the short-circuit member 35 at a portion thereof facing the short-circuit member 35 such that contact with the short-circuit member 35 and the short circuit can be facilitated. The protrusion is spaced apart from the short-circuit member 35 in a state before the curved portion is deformed.

The terminal hole 33 is penetrated by the column portion 60 for electrically connecting the terminal portion 50 and the electrode assembly 10. A sealing gasket 70 for sealing an inside of the case 20 may be provided between an inner surface of the terminal hole 33 and the column portion 60.

The terminal portion 50 is disposed on the cap plate 30.

In an embodiment, the terminal portion 50 may include a first terminal portion 50 which is electrically connected to the first electrode of the electrode assembly 10, and a second terminal portion 50 which is electrically connected to the second electrode thereof.

In an embodiment, the terminal portion 50 may be formed to have a rectangular plate shape. The terminal portion 50 may be coupled to the column portion 60 extending through the terminal hole 33 to be electrically connected to the electrode assembly 10, and may be electrically connected to the cap plate 30, or an insulating plate 54 may be interposed therebetween.

The terminal portion 50 may be connected to a connection terminal of an external device requiring electrical energy, or may be connected to a bus bar 105 (see FIG. 6) connecting the terminal portions 50 of a plurality of the rechargeable batteries 100. In an embodiment, the connection between the terminal portion 50 and the connection terminal or the bus bar 105 may be a permanent connection, such as physical contact, fitting, or welding.

Since the terminal portion 50 may be connected to the connection terminal of the external device or the bus bar 105 or the like, an external impact or a pressing force may be transferred to the terminal portion 50, which may cause breakage or deformation, and such breakage or deformation of the terminal portion 50 may limit the use of the rechargeable battery 100.

Accordingly, in embodiments of the present invention, the terminal portion 50 is slidably mounted on the cap plate 30 in a direction (e.g., one direction) in the rechargeable battery 100. However, a structural relationship between the slidable terminal portion 50 and the cap plate 30 may be varied.

In an embodiment, for example, the terminal portion 50 is coupled to the column portion 60, but is not provided with a coupling structure such as welding with the cap plate 30, such that the terminal portion 50 may be slidable by an external force.

Further, in an embodiment, a groove or a protrusion for blocking movement in a direction other than the sliding direction of the terminal portion 50 may be additionally provided for a stable structure on the cap plate 30 as well as the sliding of the terminal portion 50.

The terminal portion 50 having a plate shape according to an example embodiment of the present invention is illustrated in FIG. 1 and FIG. 2, and the terminal portion 50 is disposed on the cap plate 30 to be slidable in one direction. The sliding direction of the terminal portion 50 may be determined in various directions as desired, and a guide protrusion 38 (or protruding portion), etc., may be provided on the cap plate 30 for setting the sliding direction.

When an external force is applied to the connection terminal of the external device or the terminal portion 50 coupled with the bus bar 105, the terminal portion 50 may slide by the external force, thereby preventing or substantially preventing damage caused by the external force according to embodiments of the present invention.

In the rechargeable battery 100 according to an embodiment of the present invention, said one direction is parallel to a width direction X of the cap plate 30, and the terminal unit 50 slides by the external force transferred in said one direction.

The external force acting on the connection terminal of the external device or the terminal portion 50 coupled with the bus bar 105 may be generated by a swelling phenomenon of the rechargeable battery 100.

The swelling phenomenon indicates that the expansion of the case 20 occurs when the internal pressure is increased due to an abnormal reaction of the rechargeable battery 100. The occurrence of the swelling phenomenon may cause a side surface of the case 20 illustrated in FIG. 1 to be swollen, and an expansion ratio on a side of a wide area positioned in the width direction X of the cap plate 30 in the side surfaces of the case 20 may be increased.

Accordingly, an external force may act on the connection terminal of the external device and the terminal portion 50 coupled with the bus bar 105 and the like in the width direction X of the cap plate 30 by the swelling, and the terminal portion 50 may be provided to be slidable in the width direction X of the cap plate 30, thereby preventing or substantially preventing damage to the terminal portion 50 due to the external force according to an embodiment of the present invention.

Figure 4:
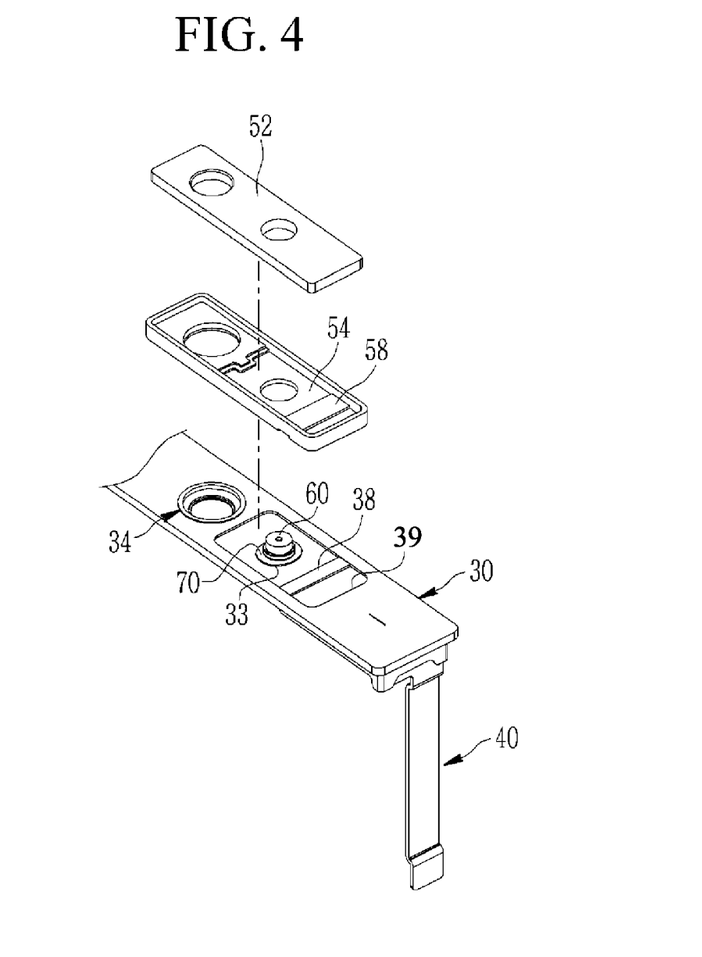
FIG. 4 illustrates a perspective view of a terminal portion of a rechargeable battery according to an embodiment of the present invention.
Figure 5:
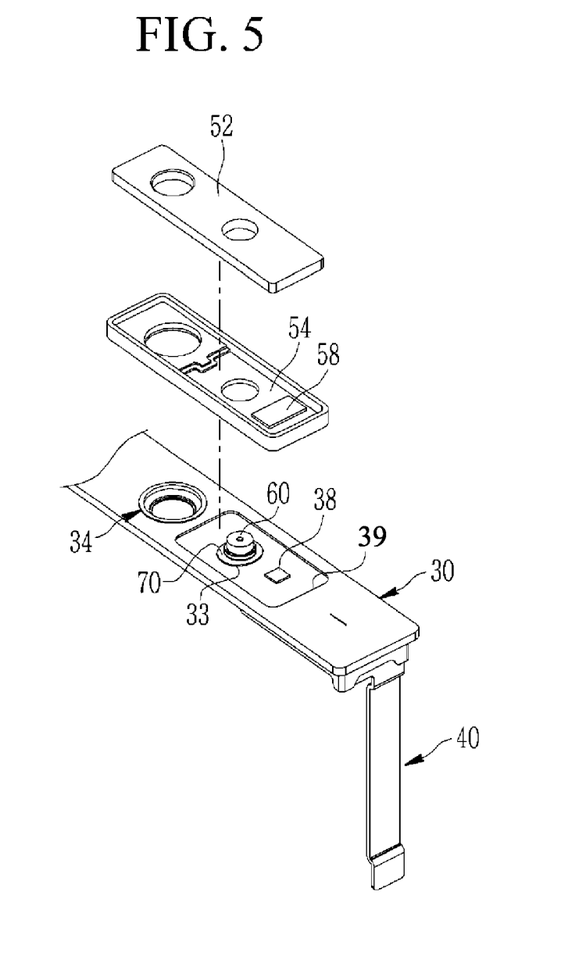
FIG. 5 illustrates a perspective view of a terminal portion of a rechargeable battery according to an embodiment of the present invention.

FIG. 4 and FIG. 5 illustrate perspective views of the terminal portion 50 according to some example embodiments of the present invention. According to the example embodiments of the present invention, the guide protrusion 38 may be provided on the cap plate 30 to extend in said one direction and to protrude toward the terminal portion 50, and the terminal portion 50 may have a guide groove 58 (or recessed portion) which extends in said one direction and into which the guide protrusion 38 is inserted to be slidable.

The guide protrusion 38 protrudes from one surface of the cap plate 30 toward the terminal portion 50 and extends along one direction in which the terminal portion 50 slides. The guide groove 58 is formed on one surface of the terminal portion 50 facing the cap plate 30 to extend along said one direction.

FIG. 2 illustrates a state in which the guide protrusion 38 is inserted into the guide groove 58 of the terminal portion 50, and FIGS. 4 and 5 illustrate the guide protrusion 38 of the cap plate 30 from which the terminal portion 50 is shown separated.

In an embodiment, the guide protrusions 38 and the guide grooves 58 have a same width in the longitudinal direction Y of the cap plate 30 such that the terminal portions 50 can be prevented from sliding in directions other than said one direction, and the guide protrusion 38 is inserted into the guide groove 58 such that the terminal portion 50 slides in said one direction on the cap plate 30.

Accordingly, the terminal portion 50 maintains structural stability on the cap plate 30, and it is possible to slide in said one direction.

In an example embodiment of the present invention, the cap plate 30 may further include a stepped groove 39 (or recessed portion) which is recessed so as to be stepped on an inner side of the case 20 and into which at least a portion of the terminal portion 50 is slidably inserted.

The stepped groove 39 has a shape recessed in the cap plate 30 so as to be stepped inside or toward the case 20 from a surface where the terminal portion 50 is disposed. The terminal portion 50 is entirely or partially inserted into the stepped groove 39 to slide.

A sliding region of the terminal portion 50 may be set by the stepped groove 39, thereby realizing the sliding structure of the terminal portion 50 and forming a stable coupling structure.

In an embodiment, the stepped groove 39 may be formed to have a same width as a portion inserted into the stepped groove 39 in the terminal portion 50 with respect to the longitudinal direction Y of the cap plate 30. For example, in an embodiment, when the entire cross-section of the terminal portion 50 is inserted into the stepped groove 39, the terminal portion 50 and the stepped groove 39 have the same width, and when a portion of the terminal portion 50 is inserted, the stepped groove 39 may have a same width as the cross-section of an inserted portion thereof This may prevent the terminal portion 50 inserted into the stepped groove 39 from sliding in a direction other than said one direction, thereby improving the structural stability of the terminal portion 50 on the cap plate 30.

In addition, in an embodiment, a length of the stepped groove 39 is longer than the portion of the stepped groove 39 that is inserted into the stepped groove 39 in the terminal portion 50 with respect to the width direction X of the cap plate 30, such that the terminal portion 50 can slide in one direction.

A sliding region of the terminal portion 50 may be limited by the stepped groove 39. A sliding range of the terminal portion 50 may be set by a length difference between the terminal portion 50 and the stepped groove 39 with respect to the width direction X of the cap plate 30. A sliding distance of the terminal portion 50 may be set to various ranges from 0.1 mm to 10 mm, and the range is an example only, and the sliding range may be varied as desired.

FIG. 2 to FIG. 5 illustrate the stepped groove 39 having a substantially rectangular shape and into which at least a portion of the terminal portion 50 is inserted according to an example embodiment of the present invention.

In an example embodiment of the present invention, the terminal portion 50 has an insertion portion 59 (or protruding portion) having a length that is shorter than the stepped groove 39 in said one direction, protrudes toward the stepped groove 39, and is inserted into the stepped groove 39.

The insertion portion 59 is provided on a surface of the terminal portion 50 facing the cap plate 30. The insertion portion 59 is provided on a lower surface of the terminal portion 50 based on a structure in which the cap plate 30 is disposed on an upper surface of the case 20 as illustrated in FIG. 1 and FIG. 2.

The insertion portion 59 may be formed over the entire cross-section of the terminal portion 50, or may be formed only at a portion thereof. FIG. 2 illustrates the insertion portion 59 which is formed to have a shorter length at the lower surface of the terminal portion 50 with respect to the longitudinal direction Y of the cap plate 30 according to an example embodiment of the present invention.

In an embodiment, the insertion portion 59 may have the same width as the stepped groove 39 with respect to the longitudinal direction Y of the cap plate 30. As a result, the terminal portion 50 in which the insertion portion 59 is inserted into the stepped groove 39 is restricted from moving in directions other than said one direction.

Since the insertion portion 59 has a shorter length than the stepped groove 39 with respect to the width direction X of the cap plate 30, the terminal portion 50 is allowed to slide in one direction.

According to an example embodiment of the present invention, the guide protrusion 38 is disposed within the stepped groove 39 to extend throughout the stepped groove 39 in said one direction, and the guide groove 58 is open at opposite ends thereof along the first direction.

Referring to FIG. 4, in an embodiment, the guide protrusion 38 is disposed inside the stepped groove 39, and the stepped groove 39 is formed on the entire surface of the cap plate 30 with respect to the width direction X of the cap plate 30. A step height of the stepped groove 39 and a protruded height of the guide protrusion 38 may be the same, but the present invention is not limited thereto.

In an embodiment, the length of the terminal portion 50 becomes shorter as compared with the guide protrusion 38 extending over the entire stepped groove 39 with respect to the width direction X of the cap plate 30, and opposite ends of the guide groove 58 of the terminal portion 50 are opened with respect to the width direction X of the cap plate 30 such that the guide protrusion 38 can be inserted into the cap plate 30.

That is, in an embodiment, the guide protrusion 38 extends through the guide groove 58 in the width direction X of the cap plate 30, and the terminal portion 50 realizes the stable sliding structure by the guide protrusion 38 in the entire sliding region.

According to another example embodiment of the present invention, the guide protrusion 38 is disposed within the stepped groove 39 to have a shorter length than the guide groove 58 in said one direction, and is entirely inserted into the guide groove 58.

Referring to FIG. 5, in an embodiment, the guide protrusion 38 may be provided so as to have a shorter length than the stepped groove 39 and the guide groove 58 in the stepped groove 39, and the guide protrusion 38 may be inserted into the guide groove 58 over the entire length.

In an embodiment, as described above, since the guide protrusion 38 has a shorter length than the guide groove 58, there may be an advantage in designing and manufacturing for forming the guide protrusion 38 on the cap plate 30.

According to an example embodiment of the present invention, the terminal portion 50 may include a terminal plate 52 electrically connected to the electrode assembly 10 and an insulating plate 54 interposed between the terminal plate 52 and the cap plate 30 to be fixed at a lower portion of the terminal plate 52, and the guide groove 58 may be provided on a surface of the insulating plate 54 facing the cap plate 30.

The terminal portion 50 including the insulating plate 54 is illustrated in FIG. 2 to FIG. 5. The terminal portion 50 in which the terminal plate 52 and the insulating plate 54 are shown separated from each other is illustrated in FIG. 4 and FIG. 5.

The insulating plate 54 serves to electrically insulate the terminal portion 50 from the cap plate 30, and the insulating plate 54 slides on the cap plate 30 in a state in which it is in contact with the cap plate 30 in an embodiment of the present invention.

The terminal plate 52 is coupled with the column portion 60 to be electrically connected to the electrode assembly 10, and is insulated from the cap plate 30 by the insulating plate 54. Referring to FIG. 2, the insulating plate 54 is coupled to the lower portion of the terminal plate 52 to slide along with the terminal plate 52.

The guide groove 58 is formed on a surface of the insulating plate 54 of the terminal portion 50 facing the cap plate 30, and the terminal portion 50 slides on the cap plate 30 in a state in which the guide protrusion 38 is inserted into the guide groove 58 of the insulating plate 54.

FIG. 2 illustrates the column portion 60 electrically connecting the electrode assembly 10 and the terminal portion 50 according to an example embodiment of the present invention. According to the present embodiment, the column portion 60 that extends through the cap plate 30 to electrically connect the terminal portion 50 and the electrode assembly 10 may be further included, the terminal hole 33 penetrated by the column portion 60 may be provided in the cap plate 30, and the terminal hole 33 may be provided to have a long shape that extends in said one direction so as to allow the column portion 60 to move in said one direction.

The column portion 60 may extend through the terminal hole 33 from the interior toward the exterior of the case 20. A cross-sectional shape of the column portion 60 and a cross-sectional shape of the terminal hole 33 may be any of various shapes, such as a circle.

In an example embodiment of the present invention, the terminal hole 33 is provided in a long shape extending along one direction in which the terminal portion 50 slides. FIG. 4 and FIG. 5 illustrate the terminal hole 33 that extends along said one direction to have a substantially elliptical shape.

Based on FIG. 2, the upper end portion of the column portion 60 is inserted into and coupled to the terminal portion 50, and at least the upper end portion thereof is moved along the one direction together with the terminal portion 50. In an embodiment of the present invention, the terminal hole 33 has a long shape that extends in said one direction in order to allow the movement of the column portion 60.

The terminal hole 33 of the long shape may limit the sliding range of the terminal portion 50 and the column portion 60 in the same manner as the guide groove 58 or the stepped groove 39. For example, the movement range of the column portion 60 may be limited by a length difference of the cap plate 30 in the width direction X between the terminal hole 33 and the column portion 60, and, thus, the sliding range of the terminal portion 50 may also be limited.

A sealing gasket 70 interposed between an inner surface of the terminal hole 33 and the column portion 60 to seal the terminal hole 33 may be further included, and may be formed of an elastic material so as to allow the movement of the column portion in said one direction and to maintain a sealed state of the terminal hole 33.

The sealing gasket 70 seals the terminal hole 33 through which the column portion 60 is extended and inserted. The sealing gasket 70 has a shape so as to surround the column portion 60, and the column portion 60 moves in one direction in which the terminal portion 50 slides, e.g., in the width direction X of the cap plate 30, and, thus, the sealing gasket 70 may also be provided to allow the movement of the column portion 60.

Therefore, according to an embodiment of the present invention, as the sealing gasket 70 is made of an elastic material having a compressive and restoring force and excellent chemical resistance, compressing and restoring is performed depending on the movement of the column portion 60, and the sealing state of the terminal hole 33 is maintained.

The sealing gasket 70 may be made of an elastic material, such as silicone rubber or epoxy. In addition, a basic shape of the sealing gasket 70 before the compressing and restoring may be provided so as to correspond to the cross-sectional shape of the terminal hole 33 of the long shape.

According to an embodiment of the present invention, the rechargeable battery 100 may further include a current collecting member 40 provided inside the case 20 to have a first side 41 coupled to the electrode assembly 10 and a second side 42 coupled to the column portion 60, and the second side 42 of the current collecting member 40 may be allowed to move in said one direction together with the column portion 60.

The first side 41 of the current collecting member 40 is coupled to the uncoated region of the electrode assembly 10, and the second side 42 thereof is coupled to the column portion 60. The current collecting member 40 may have any of various shapes, and may have a bent shape depending on positions of the column portion 60 and the uncoated regions of the electrode assembly 10 as illustrated in FIG. 2.

Based on FIG. 2, a displacement may be formed by the second side 42 of the current collecting member 40 which is coupled to the lower portion of the column portion 60 together with the terminal portion 50 and the column portion 60, while the uncoated region to which the first side 41 of the current collecting member 40 is coupled is formed of a metal thin film, thereby providing a certain degree of flexibility, and this may allow the second side 42 of the current collecting member 40 to move together with the column portion 60.

Further, in an embodiment, the first side 41 and/or the second side 42 of the current collecting member 40 may be formed of a deformable conductive metal so as to allow the second side 42 to move together with the column portion 60.

Figure 3:
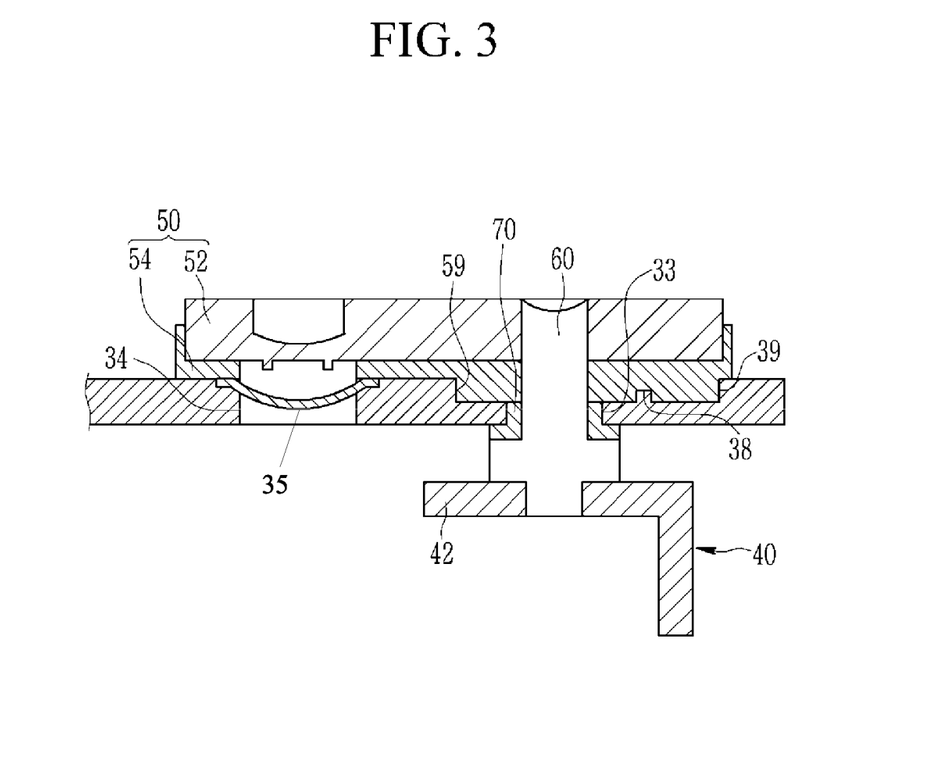
FIG. 3 illustrates a cross-sectional view of a terminal portion of a rechargeable battery according to an embodiment of the present invention.

FIG. 3 illustrates an enlarged view of the terminal portion 50 disposed adjacent to the short-circuit member 35 in FIG. 2. In an example embodiment of the present invention, the cap plate 30 includes the short-circuit member 35 that is deformable to protrude outside of the case 20 as the internal pressure of the case 20 rises, and the terminal portion 50 may slide in a state in which at least a portion thereof is disposed at an upper portion of the short-circuit member 35.

Referring to FIG. 3, according to an embodiment of the present invention, the short-circuit hole 34 and the short-circuit member 35 are included, and an edge portion of the short-circuit member 35 is fixed on a side surface of the short-circuit hole 34. The terminal portion 50 is disposed in the sliding region such that the curved portion comes into contact with the deformed short-circuit member 35 at a certain operating pressure or more. That is, the terminal portion 50 is disposed so as to cover the upper portion of the short-circuit hole 34 in the sliding region.

Accordingly, in an embodiment of the present invention, even when the terminal portion 50 is slidable, the short-circuit member 35 and the terminal portion 50 may be short circuited if the internal pressure of the case 20 is increased, thereby improving safety.

FIG. 2 illustrates a structure in which a first terminal portion 50 and a second terminal portion 50 are respectively disposed at a left side and a right side, and the second terminal portion 50 is disposed to cover the upper portion of the short-circuit hole 34. In the example embodiment of the present invention illustrated in FIG. 2, the short-circuit member 35 has a same polarity as the cap plate 30 and the first terminal portion 50, and the rechargeable battery 100 is short circuited by the short circuit of the short-circuit member 35 and the second terminal portion 50.

The first terminal portion 50 is illustrated in FIG. 2 to include the insulating plate 54, but, if desired, the first terminal portion 50 may be provided in a form in which the insulating plate 54 is omitted so as to electrically connect the first terminal portion 50 and the cap plate 30.

Further, in an embodiment, as illustrated in FIG. 2, the first terminal portion 50 may include the insulating plate 54, and the current collecting member 40 may be electrically connected to the case 20 or the cap plate 30, or the first terminal portion 50, the cap plate 30, and the short-circuit member 35 may have the same polarity through a connector member.

Figure 6:
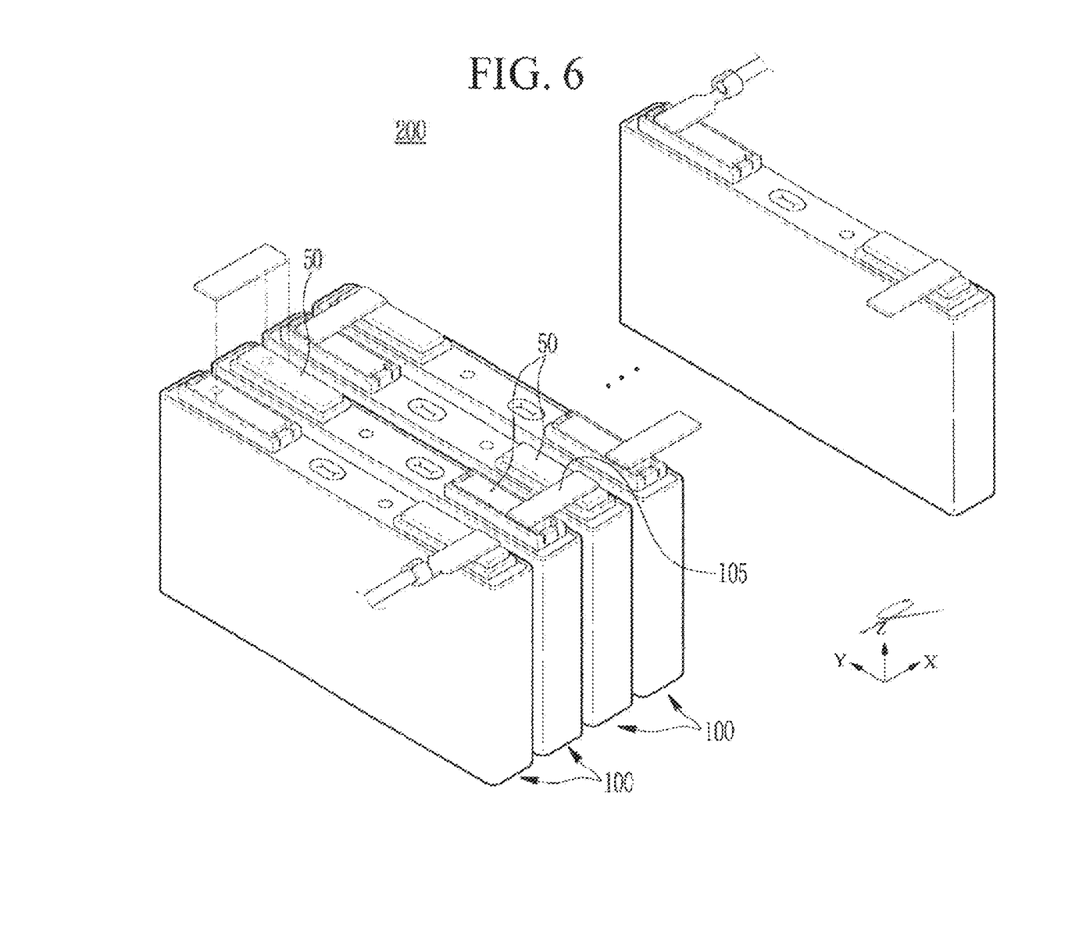
FIG. 6 illustrates a perspective view of a battery module according to an embodiment of the present invention.

FIG. 6 illustrates a battery module 200 including a plurality of rechargeable batteries 100 illustrated in FIG. 1 and FIG. 2. According to an embodiment of the present invention, the battery module 200 includes the rechargeable battery 100, each of which includes the case 20 for accommodating the electrode assembly 10 therein, the cap plate 30 coupled to an open side of the case 20, and the terminal portion 50 provided on the cap plate 30 to be electrically connected to the electrode assembly 10, and the terminal portion 50 slides in one direction on the cap plate 30. Further description of the sliding characteristics of the rechargeable battery 100 and the terminal portion 50 may be omitted.

According to an embodiment of the present invention, in the battery module 200, the plurality of rechargeable batteries 100 may be arranged along the width direction X of the cap plate 30, each terminal portion 50 of adjacent rechargeable batteries 100 may be electrically connected to each other through the bus bar 105, and the terminal portion 50 may be slidable along the width direction X together with the bus bar 105.

As described above, in an embodiment, the plurality of rechargeable batteries 100 are arranged along the width direction X of the cap plate 30. However, they may be arranged along the longitudinal direction Y of the cap plate 30, depending on the use. The rechargeable batteries 100 may be connected in series or in parallel.

The terminal portions 50 of the adjacent rechargeable batteries are electrically connected to each other through the bus bar 105. The bus bar 105 extends between the terminal portions 50 of the adjacent rechargeable batteries 100 and is welded to the respective terminal portions 50.

When swelling occurs in one or more of the rechargeable batteries 100 or a pressure is applied from the outside along the width direction X, an external force formed by the swelling or the pressure transferred from the outside of the battery module is eventually transferred to the bus bar 105 and the terminal portion 50 coupled with the bus bar 105.

In this case, according to an embodiment of the present invention, the terminal portion 50 slides along the width direction X of the cap plate 30 together with the bus bar 105, thereby forming a displacement to absorb the external force.

According to the present example embodiment, in the battery module 200, each of the rechargeable batteries 100 may further include the column portion 60 that extends through the cap plate 30 and is electrically connected to the electrode assembly 10 and the terminal portion 50, the terminal hole 33 through which the column portion 60 extends may be provided in the cap plate 30, and the terminal hole 33 may be provided to have a long shape that extends in the width direction X to allow the column portion 60 to move in the width direction X together with the terminal portion 50 and the bus bar 105.

While the present invention has been particularly shown and described with reference to some embodiments thereof, it will be understood by those skilled in the art that various changes in form and detail may be made therein without departing from the scope of the invention as set forth in the following claims.

What is claimed is:

1. A rechargeable battery comprising:
   an electrode assembly comprising a first electrode, a second electrode, and a separator;
   a case accommodating the electrode assembly therein and comprising an open side;
   a cap plate coupled to the open side of the case;
   a terminal portion arranged on the cap plate and electrically connected to the electrode assembly; and
   a column portion extending through a terminal hole of the cap plate and electrically connecting the terminal portion and the electrode assembly,
   wherein the terminal portion is slidable in a direction on the cap plate, and the column portion is movable in the direction together with the terminal portion, and
   wherein at least one of the cap plate and the terminal portion comprises a protruding portion that is spaced apart from the column portion and inserted in a recessed portion of the other of the cap plate and the terminal portion so as to be slidable in the direction to an end of the recessed portion.

2. The rechargeable battery of claim 1, wherein
   the direction is parallel to a width direction of the cap plate, and
   the terminal portion is slidable by an external force transferred in the direction.

3. The rechargeable battery of claim 1, wherein
   the cap plate comprises a short-circuit member that is deformable to protrude outside of the case as an internal pressure of the case rises, and
   the terminal portion is slidable in a state in which at least a portion thereof is located at an upper portion of the short-circuit member.

4. The rechargeable battery of claim 1, wherein
   the protruding portion comprises a guide protrusion of the cap plate that extends in the direction and protrudes toward the terminal portion, and
   the recessed portion comprises a guide groove of the terminal portion that extends in the direction and in which the guide protrusion is inserted and is slidable.

5. The rechargeable battery of claim 4, wherein the terminal portion comprises:
   a terminal plate electrically connected to the electrode assembly; and
   an insulating plate between the terminal plate and the cap plate and fixed to a lower portion of the terminal plate, and
   the guide groove is on a surface of the insulating plate facing the cap plate.

6. The rechargeable battery of claim 1,
   wherein the terminal hole has an elongated shape that extends in the direction such that the column portion is movable in the direction.

7. The rechargeable battery of claim 6, further comprising a sealing gasket between an inner surface of the terminal hole and the column portion to seal the terminal hole,
   wherein the sealing gasket is made of an elastic material such that the column portion is movable in the direction and to maintain a sealing state of the terminal hole.

8. The rechargeable battery of claim 6, further comprising a current collecting member inside the case and comprising a first side coupled with the electrode assembly and a second side coupled with the column portion, wherein the second side of the current collecting member is movable in the direction together with the column portion.

9. The rechargeable battery of claim 1, wherein the recessed portion comprises a stepped groove of the cap plate that is stepped toward an inner side of the case and into which at least a portion of the terminal portion is slidably inserted, the protruding portion comprising the at least the portion of the terminal portion.

10. The rechargeable battery of claim 9, wherein the protruding portion comprises an insertion portion of the terminal portion having a length that is shorter than the stepped groove in the direction, the insertion portion protruding toward the stepped groove and inserted in the stepped groove.

11. The rechargeable battery of claim 9, wherein
the protruding portion further comprises a guide protrusion of the cap plate that extends in the direction and protrudes toward the terminal portion,
the recessed portion further comprises a guide groove of the terminal portion that extends in the direction and in which the guide protrusion is inserted and is slidable,
the guide protrusion is arranged in the stepped groove to extend over the entire stepped groove in the direction, and
the guide groove is open at opposite ends along the direction.

12. The rechargeable battery of claim 9, wherein
the protruding portion further comprises a guide protrusion of the cap plate that extends in the direction and protrudes toward the terminal portion,
the recessed portion further comprises a guide groove of the terminal portion that extends in the direction and in which the guide protrusion is inserted and is slidable, and
the guide protrusion is arranged in the stepped groove to have a shorter length than the guide groove in the direction, and is entirely inserted into the guide groove.

13. A battery module comprising
a rechargeable battery comprising a case accommodating an electrode assembly therein, a cap plate coupled to an open side of the case, a terminal portion arranged on the cap plate and electrically connected to the electrode assembly, and a column portion extending through a terminal hole of the cap plate and electrically connecting the terminal portion and the electrode assembly,
wherein the terminal portion is slidable on the cap plate in a direction, and the column portion is movable in the direction together with the terminal portion, and
wherein at least one of the cap plate and the terminal portion comprises a protruding portion that is spaced apart from the column portion and inserted in a recessed portion of the other of the cap plate and the terminal portion so as to be slidable in the direction to an end of the recessed portion.

14. The battery module of claim 13, wherein
the rechargeable battery comprises a plurality of rechargeable batteries which are arranged along a width direction of the cap plate,
each of terminal portions of adjacent rechargeable batteries are electrically connected to each other through a bus bar, and
the terminal portion is slidable in the width direction together with the bus bar.

15. The battery module of claim 14, wherein
the terminal hole has an elongated shape that extends in the width direction such that the column portion is movable in the width direction together with the terminal portion and the bus bar.

* * * * *